J. H. Jellison,
Crimping Leather.
N° 50,074.
Patented Sep. 19, 1865.

Witnesses
F. P. Hale Jr.
C. A. Wadkins

Inventor
John H. Jellison.
by his attorney,
R. H. Eddy

UNITED STATES PATENT OFFICE.

JOHN H. JELLISON, OF MILFORD, MASSACHUSETTS, ASSIGNOR TO C. AND J. R. PIERCE & CO., OF SAME PLACE.

IMPROVED MACHINE FOR SHAPING CRIMPING-FORMS.

Specification forming part of Letters Patent No. 50,074, dated September 19, 1865.

*To all whom it may concern:*

Be it known that I, JOHN H. JELLISON, of Milford, in the county of Worcester and State of Massachusetts, have invented a new and useful or Improved Machine for Shaping Crimping-Forms; and I do hereby declare the same to be fully described in the following specification and represented in the accompanying drawings, of which—

Figure 4:
Figure 3:
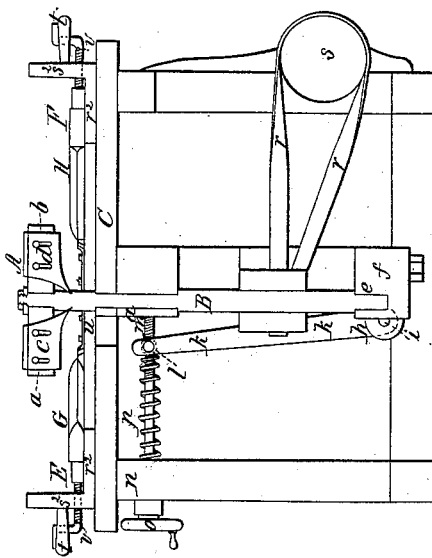
Figure 1:
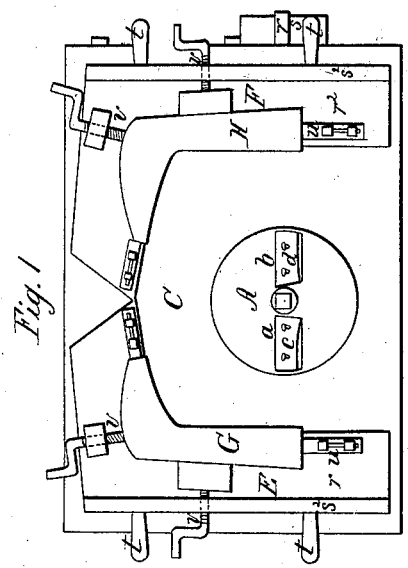
Figure 2:
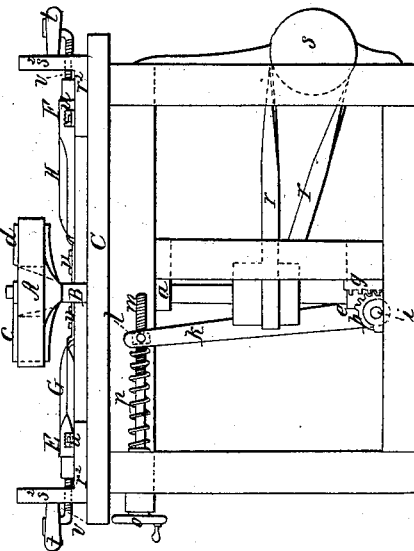

Figure 1 is a top view of it and its two form-carriers. Fig. 2 is a side elevation of it; Fig. 3, a vertical and longitudinal section. Fig. 4 is an inner side view of one of the crimping-form carriers.

In the drawings, A denotes a circular cutter-head or plate, mounted on the top of a vertical shaft, B, which extends through a bearing, $a$, supported by a table, C. The shaft projects through the table-top, and has the plate or cutter-head A arranged so that there may be between it and the said top a space sufficient for the passage of a crimping-form carrier between the two.

The cutter-head contains two cutter-throats, $a\ b$, in each of which there is a plane iron or cutter, $c$ or $d$. Both of these cutters are inclined in the same direction. The lower end of the shaft B is supported in a step, $e$, carried by a movable girt or cross-bar, $f$, provided with two toothed racks, $g\ g$, which engage with two gears or toothed sectors, $h\ h$, affixed on a cross-shaft, $i$. An arm, $k$, extends from the said shaft $i$ and supports a rotary nut, $l$, through which a slide-rod, $m$, is screwed, such rod being provided with a male screw, $m'$, to enter the nut. The rod goes through the upper girt, $n$, of the table, and has a cranked wheel, $o$, fixed on its outer end. Furthermore, a helical spring, $p$, encompasses the rod, and is so arranged as to bear against the girt $n$ and the nut $l$.

By laying hold of the cranked wheel and pulling on it the rod $m$ may be moved endwise in a manner to cause a sudden upward movement of the cutter-head to take place, the spring $p$, by its reaction, operating to restore the parts to place after the force exerted on the cranked wheel may have been removed from it. By means of the screw $m'$, the nut $l$, the arm $k$, the shaft $i$, the gears $h\ h$, and the racks $g\ g$, a downward feeding movement of the cutter-head may be effected as occasion may require. An endless belt, $r$, proceeding from a driving-pulley, $s$, and going around a drum fixed on the shaft B, serves to impart a rotary motion to such shaft and its cutter-head.

The two carriers necessary to be used with the cutter-head in dressing or shaping a crimping-form are exhibited at E and F. Each consists in part of a board, $r^2$, and having a ledge, $s^2$, extending up from its rear edge, and provided with two handles, $t\ t$. Such carrier also consists of certain devices for clamping to it an undressed crimping-form, which is represented at G or H. The said clamping devices consist of two adjustable spurs, $u\ u$, and two screws, $v\ v$, the clamp-screws being arranged and applied so as to press the toe and upper end of the crimping-form against the two spurs.

In dressing or shaping a blank for a crimping-form it first has to be cut or dressed on one side and next on the other. The inner edge of each carrier constitutes a pattern for the form of the front edge of the leg and foot parts of the crimping-form. In using the carrier its inner edge is to be borne and moved against that part of the shaft B which is between the cutter-head and the top surface of the table. The lower edges of the cutters or planing-irons are to be so curved or formed as to impart to the side of the crimping-form the necessary shape. While the cutter-head is revolving in one direction one of the carriers can be used with it in order to effect the dressing of a blank on one side, after which the blank should be introduced into the other carrier, and the cutter-head should be revolved in the opposite direction in order to dress the blank on its opposite side.

The above-described machine has been found to be of great advantage, or effect much economy of labor, in the manufacture of crimping-forms.

What I claim as my invention is—

1. The combination and arrangement of the rotary cutter-wheel A and its shaft with the mechanism, substantially as described, for moving such cutter-head vertically either slowly or suddenly, as may be required, the whole being applied to a table as explained.

2. The combination of the rotary cutter-wheel, its shaft, the mechanism for moving the wheel vertically, as set forth, and the two carriers E and F, made substantially as specified.

JOHN H. JELLISON.

Witnesses:
R. H. EDDY,
F. P. HALE, Jr.